United States Patent
Moazzami et al.

(10) Patent No.: US 12,124,495 B2
(45) Date of Patent: Oct. 22, 2024

(54) GENERATING HIERARCHICAL ONTOLOGIES

(71) Applicant: Mercari, Inc., Palo Alto, CA (US)

(72) Inventors: Mohammad-Mahdi Moazzami, San Jose, CA (US); Manikandan Sankar, Hayward, CA (US); Byong Mok Oh, Los Altos, CA (US); Sahil Rishi, San Jose, CA (US); Sho Arora, Palo Alto, CA (US)

(73) Assignee: MERCARI, INC., Palo Alto, CA (US)

( * ) Notice: Subject to any disclaimer, the term of this patent is extended or adjusted under 35 U.S.C. 154(b) by 113 days.

(21) Appl. No.: 17/168,972

(22) Filed: Feb. 5, 2021

(65) Prior Publication Data

US 2022/0253473 A1 Aug. 11, 2022

(51) Int. Cl.
| | |
|---|---|
| *G06F 16/00* | (2019.01) |
| *G06F 16/35* | (2019.01) |
| *G06F 16/36* | (2019.01) |
| *G06N 3/08* | (2023.01) |
| *G06N 20/00* | (2019.01) |
| *G06Q 10/087* | (2023.01) |
| *G06Q 30/0601* | (2023.01) |

(52) U.S. Cl.
CPC ............ *G06F 16/367* (2019.01); *G06F 16/35* (2019.01); *G06N 3/08* (2013.01); *G06N 20/00* (2019.01); *G06Q 10/087* (2013.01); *G06Q 30/0601* (2013.01)

(58) Field of Classification Search
None
See application file for complete search history.

(56) References Cited

U.S. PATENT DOCUMENTS

| | | | | |
|---|---|---|---|---|
| 7,644,052 | B1 * | 1/2010 | Chang | G06N 5/022 706/45 |
| 8,566,363 | B2 * | 10/2013 | Fang | G06F 16/367 707/802 |
| 9,740,963 | B2 * | 8/2017 | Sawhney | G06F 16/3322 |
| 10,496,691 | B1 * | 12/2019 | Chen | G06F 16/35 |
| 2003/0097353 | A1 * | 5/2003 | Gutta | H04N 7/163 |

(Continued)

OTHER PUBLICATIONS

International Search Report and Written Opinion of the International Searching Authority directed to related International Patent Application No. PCT/US2022/014181, mailed May 17, 2022; 6 pages.

*Primary Examiner* — Jean M Corrielus
(74) *Attorney, Agent, or Firm* — Sterne, Kessler, Goldstein & Fox P.L.L.C.

(57) ABSTRACT

Described herein are embodiments for machine-generating and naming ontologies for for-sale items. A neural network may be used to train information describing for-sale items into feature vectors that describe the for-sale items. These feature vectors may be sorted into clusters based on their relative proximity using clustering algorithms. The resulting clusters may be sub-divided into smaller clusters depending on the precision used in the clustering algorithm. The set of clusters may form a hierarchical data structure where each level has clusters determined at a certain precision and each lower level sub-divides those clusters. The clusters may be named based on the most salient facets that describe the for-sale items in the clusters.

18 Claims, 5 Drawing Sheets

(56) References Cited

U.S. PATENT DOCUMENTS

| | | | |
|---|---|---|---|
| 2009/0106234 A1* | 4/2009 | Siedlecki | G06F 16/81 |
| | | | 707/999.005 |
| 2012/0078595 A1* | 3/2012 | Balandin | G06F 16/367 |
| | | | 703/6 |
| 2012/0124050 A1* | 5/2012 | Yang | G06F 16/367 |
| | | | 707/739 |
| 2012/0233188 A1* | 9/2012 | Majumdar | G06F 16/355 |
| | | | 707/756 |
| 2013/0212110 A1 | 8/2013 | Stankiewicz et al. | |
| 2014/0032510 A1 | 1/2014 | Campbell et al. | |
| 2014/0067815 A1* | 3/2014 | Sun | G06F 16/35 |
| | | | 707/739 |
| 2015/0178372 A1* | 6/2015 | Seal | G06F 16/367 |
| | | | 707/737 |
| 2016/0132484 A1* | 5/2016 | Nauze | G06F 40/268 |
| | | | 704/9 |
| 2016/0179945 A1* | 6/2016 | Lastra Diaz | G06F 16/284 |
| | | | 707/739 |
| 2017/0090729 A1* | 3/2017 | Nogueira | G06F 40/205 |
| 2018/0060305 A1* | 3/2018 | Deleris | G06F 7/02 |
| 2019/0311301 A1* | 10/2019 | Pyati | G06F 16/901 |
| 2019/0392078 A1* | 12/2019 | Methani | G06F 16/3347 |
| 2020/0073953 A1* | 3/2020 | Kulkarni | G06N 3/084 |
| 2020/0134058 A1* | 4/2020 | Liu | G06F 16/2379 |
| 2022/0253473 A1* | 8/2022 | Moazzami | G06N 3/08 |

* cited by examiner

GENERATING HIERARCHICAL ONTOLOGIES

TECHNICAL FIELD

This disclosure relates generally to machine-generated ontologies and item names based on semantic relationships.

BACKGROUND

Most items may be described by a number of characteristics, such as color, size, source of origin, or cost. These characteristics not only describe an item but also describe the relationship between items. For example, items may be from the same brand, same size or same category. These relationships normally are modeled in the form of an IS-A structure. A set of such relationships describing an item relation to other items or a group of items is called an ontology. Items may be sorted by common characteristics in their ontologies to aid in later finding or identifying them. However, the descriptions must first be quantified in a way which allows comparison.

Computers may be used to analyze reference or training data to identify the ontologies and the characteristics in each of them. However, such approaches identify descriptive labels as letter combinations, not words with meaning. The resulting ontologies may include characteristics that are not helpful in classifying items. Items with similar characteristics described with different words may not be classified together. And the computer is not able to identify the items classified into a given ontology.

BRIEF SUMMARY

Provided herein are system, apparatus, method and/or computer program product embodiments, and/or combinations and sub-combinations thereof for machine generating hierarchical ontologies and names for the same.

In some embodiments, a computer-implemented method for machine generating an ontology for a plurality of for-sale objects (FSOs) may determine metrics between each pair of FSOs in the plurality of FSOs. The metrics may be based on a comparison of two feature vectors, each representing features of respective FSOs, and the two FSOs making up a pair of FSOs. The method may separate each FSO from the plurality of FSOs into one or more clusters based on the metrics and a clustering classification rule.

The method may also determine, for each cluster, a subset of features describing a set of FSOs in the cluster from the plurality of FSOs. The subset of features may each have a saliency greater than a threshold and the saliencies may be based on a set of feature vectors describing the set of FSOs. The method may label each cluster with the subset of features for that cluster.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, method and/or computer program product embodiments, and/or combinations and sub-combinations thereof for machine-generating hierarchical ontologies and names for the same.

Ontologies may be formed by sorting items based on characteristics they possess alone. For example, items made by APPLE may be put into a category, or items that are smart phones may be put in a category. Such ontologies may limit the relational or semantic information that is conveyed from the ontology. If the ontologies are instead formed as hierarchical ontologies based on the set of characteristics, new relational information may be convened. Embodiments of this disclosure allow for clustering of items based on relative similarity of all of their characteristics, rather than just a single characteristic. At different levels of clustering, different characteristics may determine which items are sorted together. The clustering may be data-driven, resulting in the most similar items grouping based on several characteristics, rather than by characteristics selected by the ontology creator.

Further, embodiments described of this disclosure allow for the different clusters at the different levels of the hierarchy to be named based on the characteristics most salient to the items being sorted into that cluster. The resulting hierarchy may allow for simplified searching for items. A search term may identify a cluster where that search term is specifically salient. Relying on this salient term, other branches of the hierarchy maybe ignored and further searching may be reduced to only those clusters that are hierarchically below the identified cluster. This may also allow for improved search suggestions by focusing on which additional characteristics further subdivide clusters in the hierarchy.

As a result, machine-generated hierarchical ontologies with machine-generated names can provide advantages over traditional IS-A ontologies with user-designated names, as will be apparent to those skilled in the art from the present disclosure.

Figure 1:
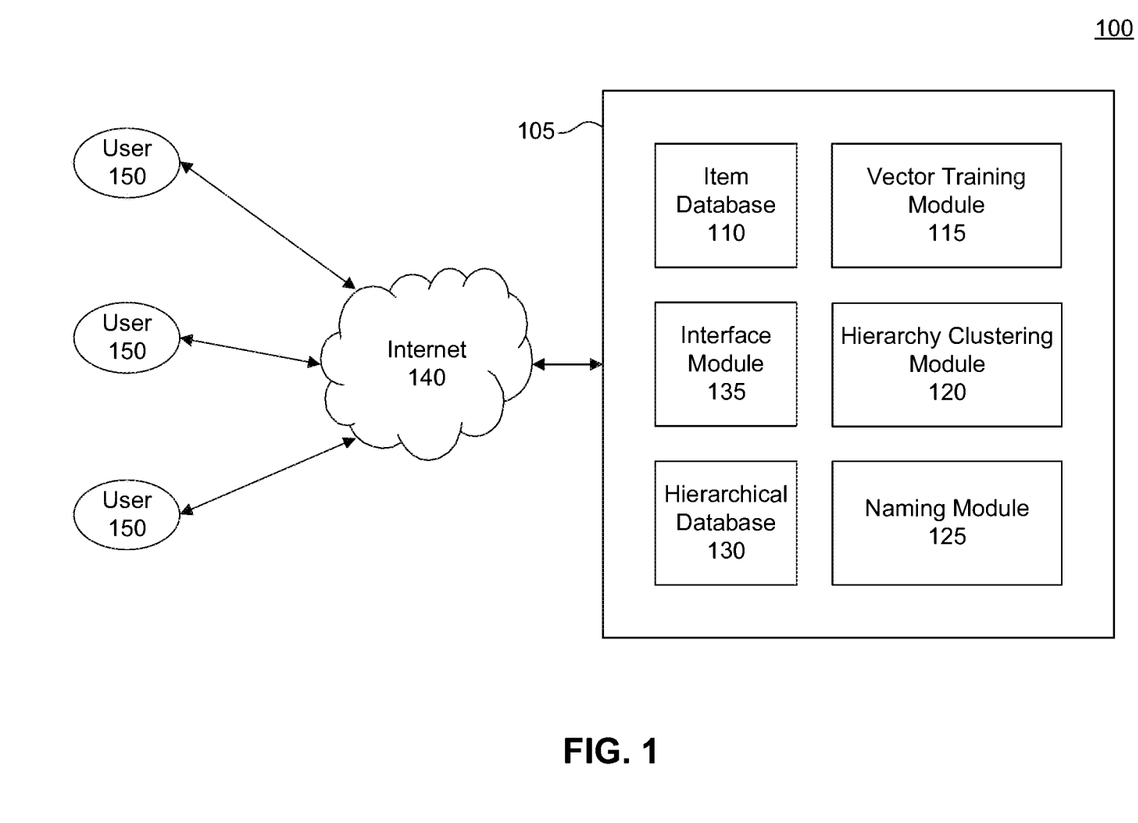
FIG. 1 illustrates a block diagram of an e-commerce system, according to some embodiments.

FIG. 1 illustrates a block diagram of an ecommerce system 100, according to some embodiments. The ecommerce system 100 may allow users 150 to access an ecommerce site 105 through the internet 140. This ecommerce site 105 maybe used by users 150 to offer for-sale items to other users 150. In this sense, users 150 may be buyers, sellers, or both.

The ecommerce site 105 may have an item database 110, a vector training module 115, a hierarchy clustering module 120, a naming module 125, a hierarchical database 130, and an interface module 135. These elements may be distributed across one or more computer systems in a network or a cloud. For example, the interface module 135 and the hierarchical database may be located on a server accessible to users 150 through the internet 140. The item database 110, the vector training module 115, the hierarchy clustering module 120, and the naming module 125 may be distributed on other servers or computer systems that are not directly accessible to users 150 through the internet 140, but which are in communication with the hierarchical database 130 and the interface module 135 through a network or cloud computing system.

The ecommerce site 105 may be an example of a system for machine-generating and naming ontologies. The vector training module 115, the hierarchy clustering module 120, and the naming module 125 may be used to machine-generate and name ontologies and structure them in a hierarchical data structure.

The item database 110 may store information about items. The items may be actual for-sale items or example items that could be for-sale items on the ecommerce site 105. The information about the items may include images, descriptions, costs, product identifiers, and other information relevant to the sale or potential sale of such items on the ecommerce site 105. In some embodiments, the information stored in item database 110 may be ontologies for the items.

For example, a for-sale item may have a set of characteristics that are required to post it for sale on the ecommerce site 105, such as a name, a manufacturer, a color, a size, technical features, a weight, a cost, and images of the for-sale item. This information may be stored in the item database 110 as associated with the for-sale item.

In another example, an example item may be identified from internet searching or scraping of manufacturers websites. This item or items like may not yet be for sale on the ecommerce site 105, but it may be desirable to sell such items through the ecommerce site 105. Information about such an item may be in the form of a multi-modal data set that may include textual, visual, numerical, or categorical information, such as a name, a manufacturer, an item type, a color, a size, a weight, a cost, a material, a quality, text describing the example item, or images of the example item. Each data modality carries similar or complimentary information about the item. This information may be stored in the item database 110 as associated with the example item.

The information stored in the item database 110 may include tags or markers, such as metadata tags, which identify the type of information. For example, if a for-sale item that is for sale on the ecommerce site 105 is added to the item database 110, its manufacturer may be a required entry to post it for sale. Because the ecommerce site 105 has tagged the manufacturer as a specific field, the information about this item may specifically identify that this is manufacturer information.

The entries item database 110 may be non-uniform in their content and formatting. Entries may have no identifying markers. For example, an example item may simply be an article title along with text and images accompanying that title. As a result, the information for each item in the item database 110 may differ in number of elements or clarity of detail, in that different features may be lumped into a single portion of the information for one item while they are broken out and possibly even specifically identified for other items. Further, similar or identical items may be stored in the item database 110 with differing levels of detail in information.

Vector training module 115 may be configured to access the entries in item database 110 and convert it into a feature vector. The feature vector may be a vector representation of the information for a given item in the item database 110. The feature vector magnitude and direction being representative of the information about the item from the item database 110. Each vector for each item may have the same number of elements or dimensions.

In some embodiments, the information from the item database 110 may be preprocessed by the vector training module 115 to identify key descriptors and remove filler words or stop words, such as articles and sentence punctuation. Images may be processed to identify features that can be represented with words. For example, an image may be processed to identify a color of an item. Vector training module 115 may process the information into ontologies, creating an ontology for each item.

In some embodiments, vector training module 115 converts the information into numerical representations. This may involve identifying key descriptors or facets that describe the items. Descriptive information about an item may be broken down into more than one key descriptor or facet. For example, an item may be described as a "blue iPhone case." This may be broken down into the facets "blue," describing the color, and "iPhone case," describing what it is. These facets may be assigned numerical values for further processing. The pre-processed information may then be vectorized.

The vector training module 115 may be configured such that some words result in the feature vectors being closer to each other than other words. This may be interpreted in that items with common features, but which are not the same type of item, may have facets that are similar. The result is components or dimensions in the feature vectors that are similar.

This similarity is relative to the level of precision being applied. Similar items may have very small differences between the feature vectors. Items that are different, but with similar features or descriptor may result in feature vectors that are closer relative to each other than other vectors, but further apart than the more similar items. For example, iPhone and iPad may be closer to each other than the word bag. This is in part due to the common characteristic. However, two iPhones of the same model may be closer still.

In some embodiments, the numerical representations of the facets allow for similarity between words that convey similar semantic meanings, but which are not similar in a syntactic sense. For example, the colors white, ivory, and pearl all appear similar and share a common semantic meaning. While not identical, we associate them together and may sometimes describe ivory- or pearl-colored items as "white." However, syntactically, their spellings are very different. The numerical values assigned to facets may indicate their semantic similarity.

In some embodiments, each component of the vector may not represent a specific facet. Each dimension may instead represent several words facets of the item. Each facet of the item may be part of one or more dimensions of the feature vector, meaning that information about each facet may be spread across one or more components of the vector.

In some embodiments, the item information is mapped to the feature vector through a non-linear function. This may be accomplished by a neural network configured to generate feature vectors from the item information according to the feature vector characteristics described herein. The neural network may be part of the neural network defined in FIG. 5 below.

In some embodiments, proximity of feature vectors may be found by a metric function. This may be a difference function or a cosine similarity function. A common quantitative metric may be used to compare all feature vectors for a set of item information in the item database 110.

The hierarchy clustering module 120 may form a hierarchical data structure of clusters of items. The clusters may be formed from groups of feature vectors that have a similar metric function value or measure. The level of similarity for a given cluster may be based on the level of the hierarchical data structure in which the cluster exists. For example, at the highest level of the hierarchical data structure, all of the feature vectors may be in a single cluster indicating the entire body of feature vectors. At each lower level, the precision may increase such that the clusters may grow smaller and smaller at each level, depending on the proximity of the feature vectors as measured by the metric function. In some embodiments, the lowest level of the hierarchical data structure may be a cluster of a single feature vector. The level of precision set for identifying the clusters may set the proximity of feature vectors falling within the clusters. Items may belong to the same cluster in one level of precision and a different cluster at another level of precision.

The feature vectors may be configured such that hierarchy clustering module 120 may place feature vectors of items that are similar into a single cluster for a given precision. For example, items have nearly identical sets of facets may have similar magnitudes and directions such that there is little distance, as measured by a metric function, between their feature vectors. These items might be placed in the same clusters at multiple levels of the hierarchy. Other items might have some common facets, such as brand or color, but not be the same type of item. These items might end up together in clusters at some levels, but not at others.

In some embodiments, the hierarchy clustering module 120 may be configured to create the hierarchical data structure using a predetermined list of precisions for each level, a predetermined precision step size between levels, or an adaptive step size based on the resulting clusters, such as the number of feature vectors falling in each cluster at each level of the hierarchy. The level of precision may be based on how the feature vectors are distributed in the vector space that the feature vectors occupy. The hierarchical data structure may be formed level by level, with a level being assigned and clusters being formed according to the precision for that level. Hierarchy clustering module 120 may form or identify clusters at each level of the hierarchical data structure using clustering algorithms or techniques that are known in the art.

The hierarchical data structure may be constructed such that clusters at a higher level are connected to the clusters at a lower level that contain the items in the higher-level cluster. In some embodiments, a cluster at a lower level connects to a single cluster at a higher level.

The hierarchical data structure may represent an organized and classified set of machine-generated ontologies. The ontology for an item may be described by the feature vector for that item, and each cluster may represent a group of classified ontologies. The clusters at each level may represent different classification schemes for the ontologies based the content of the ontologies themselves.

The naming module 125 may identify a name for each cluster at each level. This name is machine generated and may be based on the item characteristics of the items in the cluster. For a given cluster, some item characteristics may contribute more to the assignment of a given feature vector to that cluster than other item characteristics. Across the items in the cluster, such item characteristics may be common. The feature vectors may be analyzed to identify the most salient item characteristics. Salient item characteristics may be those which most contribute to an item being assigned to a particular cluster. Using these characteristics to name clusters may result in names that provide superior identification of items in a cluster. For example, when searching for an item, the cluster name may focus on the key characteristics. When combined with the structure of the hierarchical data structure, a search engine may more quickly parse the branches based on the identified characteristics. The search results can then be limited to the clusters with names which most align with what tis sought. A user 150 performing such a search would then be able to parse the most relevant search results.

Saliency analysis may be used to identify the most salient characteristics. In some embodiments, saliency analysis may be performed by forming a Jacobian matrix for a set of feature vectors in the cluster of interest. The Jacobian matrix may be formed by taking the derivative of each output component with respect to each input element. Each output is a feature vector value and the corresponding inputs are facets. This derivative determines how much a given facet contributed to the particular feature vector component. In this context, the Jacobian matrix describes the importance of each facet. The facets may be reordered based on their magnitude of contribution, with the larger values indicating greater saliency.

In some embodiments, given an embedding of items into a set of feature vectors e for input words with the associated similarity score, sim(i, j), the pair (e, sim) is assigned or associated with a class score $S_{sim}(e)$. Sim(i,j) is the similarity score between the ith and jth items in the set. The saliency determines which characteristics in the set e make the most significant contribution to the class $S_{sim}(e)$, and thus the contribution to the similarity of input items i and j.

In some embodiments, such as deep neural models, the class score $S_{sim}(e)$ is a highly non-linear function. It may be approximated with a linear function by computing the first-order Taylor expansion as following:

$$S_{sim}(e) \approx w(e)^T e + b$$

where w(e) is the derivative of $S_{sim}(e)$ with respect to the set e.

$$w(e) \simeq \frac{\delta S_{sim}(e)}{\delta e}$$

The magnitude (absolute value) of the derivative may indicate the sensitiveness of the final decision to the change in one particular dimension, telling us how much one specific dimension of the word embedding contributes to the final decision. The saliency score may be given by:

$$\text{Saliency}(word_k) \simeq \left| \sum_e w(e) \right| \text{ for } e \text{ in } word_k$$

where $word_k$ is the kth facet.

In some embodiments, a subset of the facets are identified as being most salient. For example, the top five or six facets may be selected. These facets may indicate features that most contributed to the assignment of the feature vectors to the cluster. The cluster may be named based on the selected facets. For example, the cluster may be named after selected facets in a list, as a phrase, or separated by commas.

Each cluster may be similarly analyzed. As the clusters change in size at different levels, the corresponding names for a cluster may also change, as different facets may have caused the division of a higher-level cluster into multiple lower-level clusters.

As an example, items may have a color facet and there may be red, orange, and blue items. Depending on how the feature vectors are generated, red may be closer to orange than to blue, as evaluated by the metric function. The items may also have a product descriptor facet, such as iPhone. The clusters at some levels of the hierarchical data structure may put all the iPhones together, regardless of their color, while at a lower level the color may be the key differentiator. Saliency analysis would show at the higher levels that the color might have low saliency while the product descriptor had high saliency. At the lower level the color might be the more salient facet, while iPhone has ceased to impact clustering, as all the items in the cluster are iPhones.

In some embodiments, saliency may be quantized to be a value between zero and one. This may involve applying a relative normalization factor in the saliency calculation.

In some contexts, this may result in comparing the complete description and determining, at least in this example, whether the most important part of the description for a blue iPhone is that the iPhone is blue, that it is an iPhone, or that it is a blue iPhone. This naturally extends to the long lists of facets that may be used to describe a variety of items in the item database 110.

Once the clusters are named, the named hierarchical data structure may be stored in the hierarchical database 130 and used by the interface module 135 as a basis for searching. The stored hierarchical data structure may thus be a machine-generated and named set of ontologies with a hierarchical structure based on how the ontologies relate to one another.

Interface module 135 may allow users 150 to access the ecommerce site 105 in order to search for or offer for-sale items. The interface module 135 may have access to the hierarchical database 130 to use the hierarchical data structure as a basis for functions it performs and may be able to add new items and corresponding item characteristics or descriptions to the item database 110.

For example, a user 150 may search for items with a certain feature and the named clusters may be searched to identify which clusters are most relevant. Users 150 tend to search for items based, not on a complete ontology of the item, but on a subset of the ontology that is most familiar or relevant to the user 150. Because the cluster names are not the complete ontology, the search may match clusters with names that most closely match the search input. In this way, the search may avoid other results which match the search terms, but which are not critical descriptors. In some embodiments, this may result in the search engine identifying results that are closer to what the user 150 is actually searching for and result in turning fewer bad results. In some embodiments, the hierarchical data structure may allow for faster searching of items in the hierarchical database 130.

The hierarchical data structure in the hierarchical database may be used by the interface module 135 to identify search results or additional parameters for narrowing. Based on the search results from the initial search, the interface module 135 may access the hierarchical database 130 and look at lower levels in the hierarchical data structure. These lower levels may reveal key terms that would differentiate between groups of different items in the hierarchical data structure. The interface module 135 may query whether the user 150 wants to narrow searching based on those terms to focus on one group of items or another. This can aid the user 150 in finding the items that they actually are looking for.

In another example, a user 150 may want to post a for-sale item. The hierarchical database 130 indicates how items cluster together and which characteristics are key at different levels. This may be used to guide the user 150 through the for-sale item description entry by requesting similar types of characteristics or by identifying, using the hierarchical data structure, similar items that exist in the item database 110 as examples.

The naming module 125 may automatically provide the clusters names based on the important features of items in the cluster without the need for human intervention. This allows for the ecommerce site 105 to automatically name clusters of items in the hierarchical database to allow for ease of searching with interface module 135. In some embodiments, when the interface module 135 receives new descriptions of for-sale items or identifies search terms that a user 150 matches up with their end selection, new item descriptions may be added to the item database 110, allowing the vector training module 115, hierarchy clustering module 120, and naming module 125 to update the hierarchical data structure and cluster names. This may then be stored in the hierarchical database 130 for further use by the interface module 135.

In some embodiments, the vector training module 115, the hierarchy clustering module 120, and the naming module 125 may be configured to use side information to weight the facets of items. The side information may be information about a feature or facet of an item, such as price, weight, condition or some other feature. The side information may reflect business needs that are not encoded in the vectors, such as the importance of certain characteristics in a hierarchy. For example, brand information may be more important than size or color of an item. The side information may be used to incorporate this information because it is not determined from the data used to train the vectors. This information may be encoded into a feature vector by emphasizing or de-emphasizing the related facet or facets. The vector encoding process performed by vector training module 115 may normally be ambiguous to this information.

For example, items may have one key differentiating facet, which could be emphasized to better differentiate between items. Alternatively, items might have a facet that is irrelevant to users 150, but which is often reported in item descriptions. The vector training module 115 could de-emphasize this facet to focus on other more important facet. In some embodiments, side information may be provided by an external source and may be the result of market data, sales analysis, or analytics based on sales data in marketplaces, including online marketplaces such as the ecommerce site 105.

In some embodiments, multiple facets may be weighted. The weighting may be item specific, resulting in the vector training module 115 weighting facets in some feature vectors and not performing any weighting in other feature vectors. This may be in part due to the different types of facets that different items may have.

As an example, side information might be that several items may have many identical or nearly identical facets and only substantially differ in one. These may be, for example, iPhones of the same make and model, but with different colors. This facet is key in differentiating them. The example for incorporating this side information might be weighting the color facet to be more important so that the feature vector for each item will better capture this difference. In some embodiments, this may allow the hierarchy clustering module 120 to form clusters that more accurately sort the items or the naming module 125 to better identify the name of the cluster.

In some embodiments, side information may be incorporated by scaling the saliency or setting it to a value indicating a specific saliency. For example, a low saliency might be scaled by a factor of two to show increased importance. Or, the low saliency might be set to a higher value indicating the relative saliency from the side information.

Where saliency is quantized, the scaling of the saliency or the value to which the saliency is set may be scaled or adjusted based on the quantization levels. For example, if a maximum quantization indicates highest saliency and side information indicates that a given characteristic is very important, the saliency for the given characteristic may be set to the highest value or scaled by a factor that places the saliency near the highest value.

Figure 2:
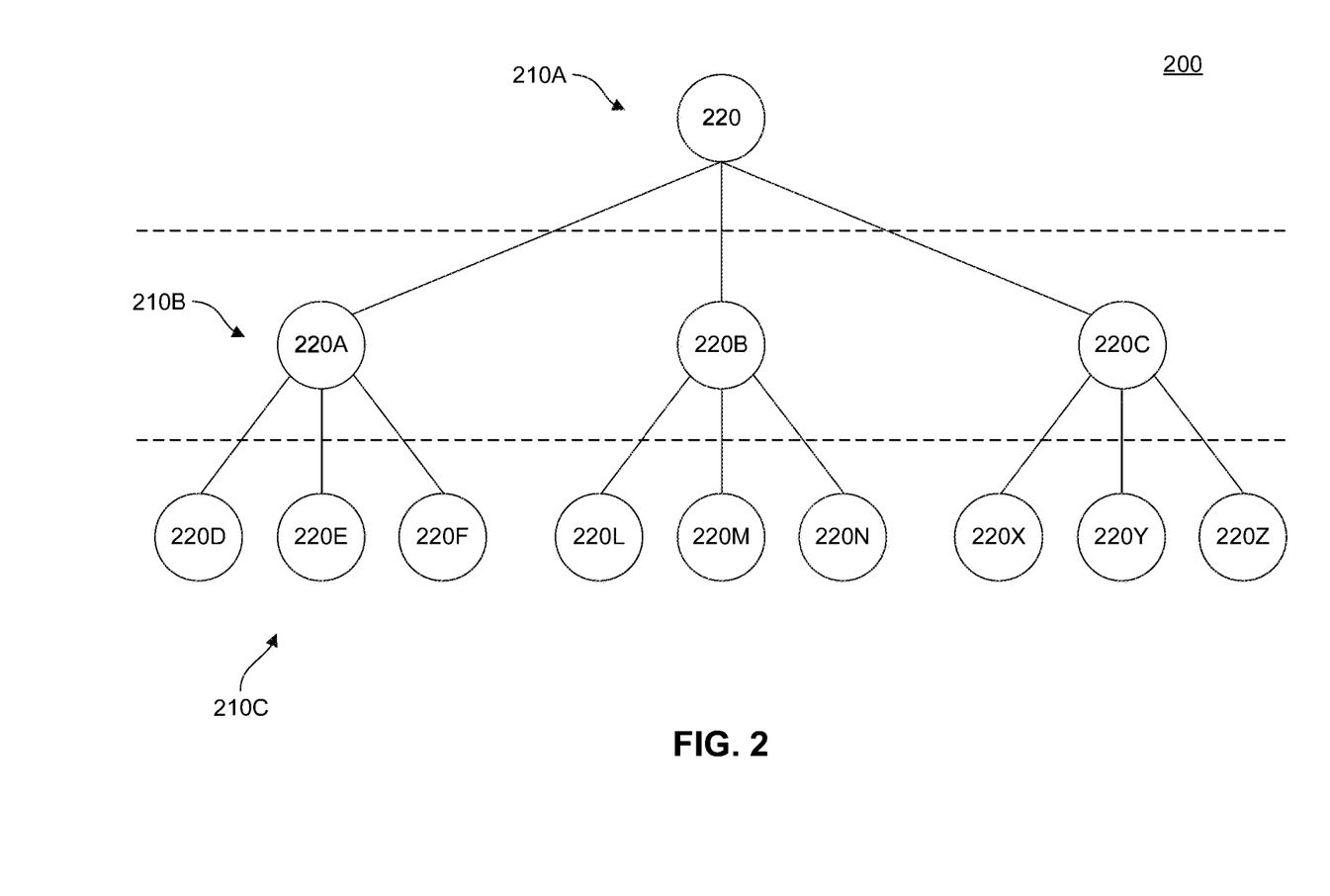
FIG. 2 illustrates a block diagram of a hierarchical data structure, according to some embodiments.

FIG. 2 illustrates a block diagram of a hierarchical data structure 200, according to some embodiments. The hierarchical data structure 200 may be stored in the hierarchical database 130 of FIG. 1.

The hierarchical data structure 200 may be made up of multiple levels 210 or tiers, such as level one 210A, level two 210B, and level three 210C (collectively, levels 210). Each of the levels 210 may have one or more clusters 220, such as clusters 220, 220A, 220B, 220C, 220D, 220E, 220F, 220L, 220M, 220N, 220X, 220Y, and 220Z (collectively, clusters 220). Each of the levels 210 represents a different precision or threshold of difference for the clusters 220. The levels 210 and the clusters 220 may be generated or determined using the hierarchy clustering module 120 of FIG. 1.

Each of the clusters 220 may be made up of one or more feature vectors that are within a certain distance of each other as evaluated by the metric function and a threshold or precision for the given level 210 on which the cluster 220 is found. Each feature vector may be a vector representation of an item ontology. The clusters 220 may be named using the naming module 125 of FIG. 1.

The hierarchical data structure 200 is an example embodiment where cluster 220 is on level one 210A, which may be a top level where all feature vectors exist in a single cluster, in this case cluster 220. The feature vectors in cluster 220 may have been divided into new clusters 220A, 220B, and 220C using hierarchy clustering module 120 of FIG. 1. Here, a new precision would be applied to result in dividing all the feature vectors in cluster 220 into the new clusters 220A, 220B, and 220C in the lower level two 210B. This may also have been repeated to further divide the clusters 220A, 220B, and 220C into clusters 220D, 220E, 220F, 220L, 220M, 220N, 220X, 220Y, and 220Z in level three 210C.

For example, the feature vectors in cluster 220 may represent iPhones, t-shirts, sweatshirts, and laptops. When proceeding to level two 210B, the cluster 220 may be divided such that iPhones fall into cluster 220A, t-shirts and sweatshirts fall into cluster 220B, and laptops fall into cluster 220C. This may be based on how the clustering occurs in hierarchy clustering module 120 of FIG. 1, including that the metric function shows that these items are a certain distance apart. This clustering may be based on common features, such as the iPhones all being iPhones, or having similar features, such as sweatshirts and t-shirts both being clothes that a person wears on their torso and arms. The naming module 125 may name the clusters 220A, 220B, and 220C based on these significant features that resulted in their division.

At level three 210C, cluster 220A may be subdivide the iPhones based on the color, model, or other features, into clusters 220D, 220E, and 220F. This may be similarly performed for the laptops in dividing cluster 220C into 220X, 220Y, and 220Z. The t-shirts and sweatshirts may be divided based on their respective type of shirt, color, or other attributes, dividing cluster 220B into 220L, 220M, and 220N. Note that further subdivisions could occur until a cluster 220 contains a single feature vector representing a single item.

It should be understood that the example hierarchical data structure 200 depicted in FIG. 2 is only exemplary and that clusters 220 may divide into any number of clusters 220 at a lower level, not just three, depending on the clustering algorithm or precision applied by hierarchy clustering module 120 in FIG. 1. And the number of levels depicted may be more or less than the three shown. Further, those skilled in the art will appreciate that the number of clusters 220 in each level for each branch of the hierarchical data structure 200 may be different and that branches may stop at an earlier level for some clusters. For example, if only a single item was divided into cluster 220A at level two 210A, there would be no need to further subdivide cluster 220A at level 210C, as the clustering algorithm is not capable of dividing a single entity cluster 220.

Figure 3:
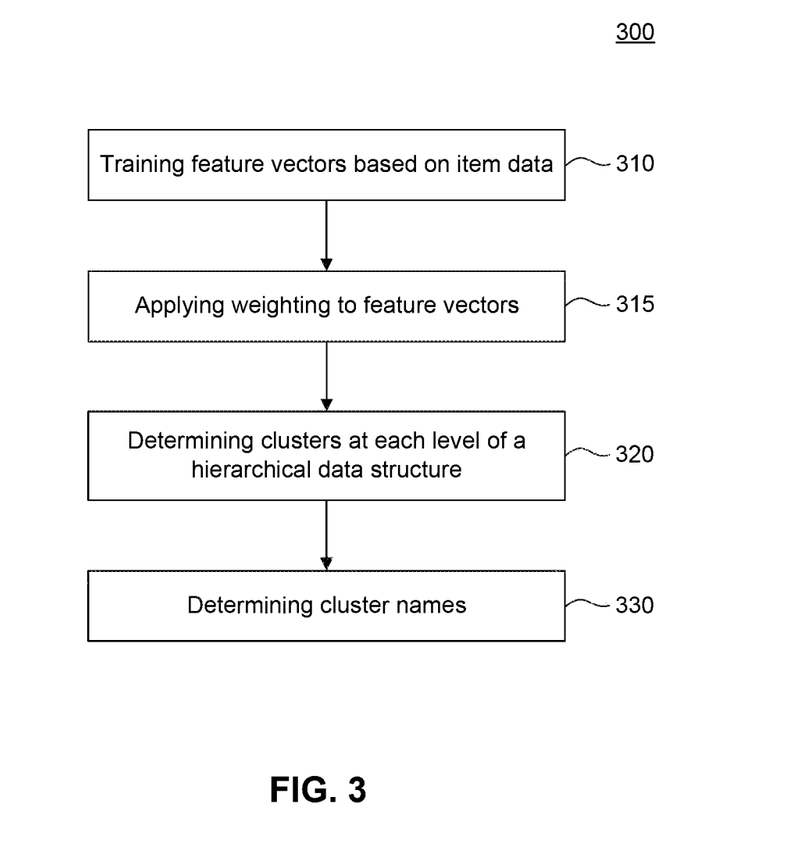
FIG. 3 is a flow chart illustrating a method for generating a hierarchical data structure and employing machine guided naming for clusters in the hierarchical data structure, according to some embodiments.

FIG. 3 is a flow chart illustrating a method 300 for generating a hierarchical data structure and employing machine-guided naming for clusters in the hierarchical data structure, according to some embodiments. As part of the method 300, machine-generated ontologies may also be created. The overall hierarchical data structure may be made up of representations of these ontologies organized into clusters and assigned names.

In some embodiments, the steps of method 300 may be performed by an ecommerce site 105. For example the hierarchical data structure may be generated by a combination of the vector training module 115 and the hierarchy clustering module 120 depicted in FIG. 1. The clusters in the hierarchical data structure may be named using naming module 125 and the resulting hierarchical data structure with machine-named clusters may be stored in hierarchical database 130.

In 310, vector training module 115 trains feature vectors based on item information. The item information may be a number of for-sale items with accompanying information that includes or describes characteristics of the for-sale items. This may be information stored in the item database 110 of FIG. 1. As part of step 310, the item data may be pre-processed to remove filler or stop words and punctuation.

Vector training module 115 may use a neural network to convert information that describes characteristics of the for sale items into feature vectors. The neural network may be configured to identify the words that represents characteristics as facets of a description of the for-sale item. The neural network may combine the facet information into the feature vector, where each element of the feature vector is a combination of numerical representations of one or more facets. In some embodiments, each element in the feature vector is a combination of multiple facets such that no feature vector component is representative of a single facet.

As part of operation 310, vector training module 115 may organize the item information into ontologies, where the item ontology is made up of the facets that describe the item. In some embodiments, the feature vector itself may be the ontology.

In 315, vector training module 115 applies weighting to the feature vectors. The weights may be determined based on side information about the items represented by the feature vectors or the facets of those items. The weights may emphasize or de-emphasize one or more facets. The weighting may be applied to the facets in the neural network so that the feature vector incorporates the weighting into the vector elements. Operation 315 is optional and may be applied to no feature vectors, some feature vectors, or all feature vectors, depending on which facets are weighted.

In some embodiments, the weights may be set based on a quantization scale and the side information may indicate which quantization level the weights should scale the values to. In some embodiments, instead of scaling by a weight into a quantization level, the side information may indicate which quantization level to set the values in the feature vector to. In 320, hierarchy clustering module 120 determines clusters at each level of a hierarchical data structure. The clusters are made up from a set of feature vectors, such as those trained in operation 310. The first level of the hierarchical data structure may contain a single cluster of all the feature vectors or may be an initial clustering step into multiple clusters. The levels of the hierarchical data structure may be defined as the clusters at each level are further subdivided into smaller clusters. For example, a new level of the hierarchical data structure may be defined when operation 320 identifies that a cluster at the current level may be further processed and broken down into other clusters. In some embodiments, a predefined number of total levels of the hierarchical data structure is predefined to a fixed amount. Each level may contain one or more clusters formed using a precision level or threshold that further refines the clusters from a next higher level.

Hierarchy clustering module 120 may use a clustering algorithm to divide feature vectors into clusters. A precision level may be set in the clustering algorithm that controls the proximity of feature vectors in the clusters, with the proximity defined according to the metric function. In some embodiments, the precision level may be a parameter that controls how the clustering algorithm defines cluster centers or boundaries. The precision level may be determined as new levels of the hierarchical data structure are defined.

In some embodiments, the hierarchical data structure has a predefined total number of levels and the precision for each level may be determined as a set based on how the cluster size will break down across the levels. For example, the precision level may be set so the clusters in the lowest level have a certain number of items in them or so the change in cluster size across levels is relatively linear across each level.

The clustering algorithm may be configured to determine clusters from all of the feature vectors in a single clustering operation or from the feature vectors of a specific cluster at a higher level in the hierarchical data structure.

In 330, naming module 125 determines cluster names. The cluster names may be determined based on the most important facets in the feature vectors in a given cluster. Importance of facets may be based on the amount of contribute the facets make to dividing the feature vectors into the given cluster. In some embodiments, saliency analysis may be performed to determine the importance of facets.

Naming module 125 may perform saliency analysis by forming the Jacobian matrix for the set of feature vectors. The input elements may be facets and the output elements may be the elements of the feature vectors. Each element of the Jacobian matrix is the derivative of an output element with respect to a given input element. The elements of the Jacobian describe the importance of the facets by quantifying how much each facet contributed to the elements of the feature vector.

As part of operation 330, naming module 125 may reorder or perform a comparison of the elements of the Jacobian to find the facets with the largest contribution. In some embodiments, a certain number of the facets with the largest contribution are considered the most important facets. The certain number may be five or six facets. The cluster may be named based on identifiers or words associated with those facets, where the identifiers or words describe the object to which the facet is attributed.

In some embodiments, the saliency analysis may involve a quantization of the relative saliency between two or more vectors. The saliency may be calculated as described above and then normalized into a quantization between zero and one.

In some embodiments, side information may be incorporated by scaling the saliencies for different facets into specific quantization levels. This may be accomplished by using a scaling factor or setting the saliency between a facet in two vectors to a specific value. This may be used to emphasize certain characteristics in naming. For example, side information may indicate that users search by certain characteristics and that those characteristics are better for differentiating between similar items. By scaling those facets, two cluster names will include the key, but different characteristics, allowing a search to more quickly discern between the two and increasing the speed at which a search will find items a user is searching for.

Method 300 may also store the hierarchical data structure, the clusters, and the cluster names in memory, such as hierarchical database 130. The hierarchical data structure, the clusters, and the cluster names may be stored as they are generated so that one or more operations in method 300 stores the information or they may be stored in a single step once the method 300 is complete. For example, hierarchy clustering module 120 may store the hierarchical data structure and the clusters in the hierarchical database 130 as they are generated and naming module 125 may store the cluster names in the hierarchical database 130 as they are generated. Alternatively, the entire hierarchical data structure, including the clusters, may be passed to naming module 125, which generates the names of the clusters and then stores the hierarchical data structure and the cluster names in the hierarchical database 130.

Example Computer System

Figure 4:
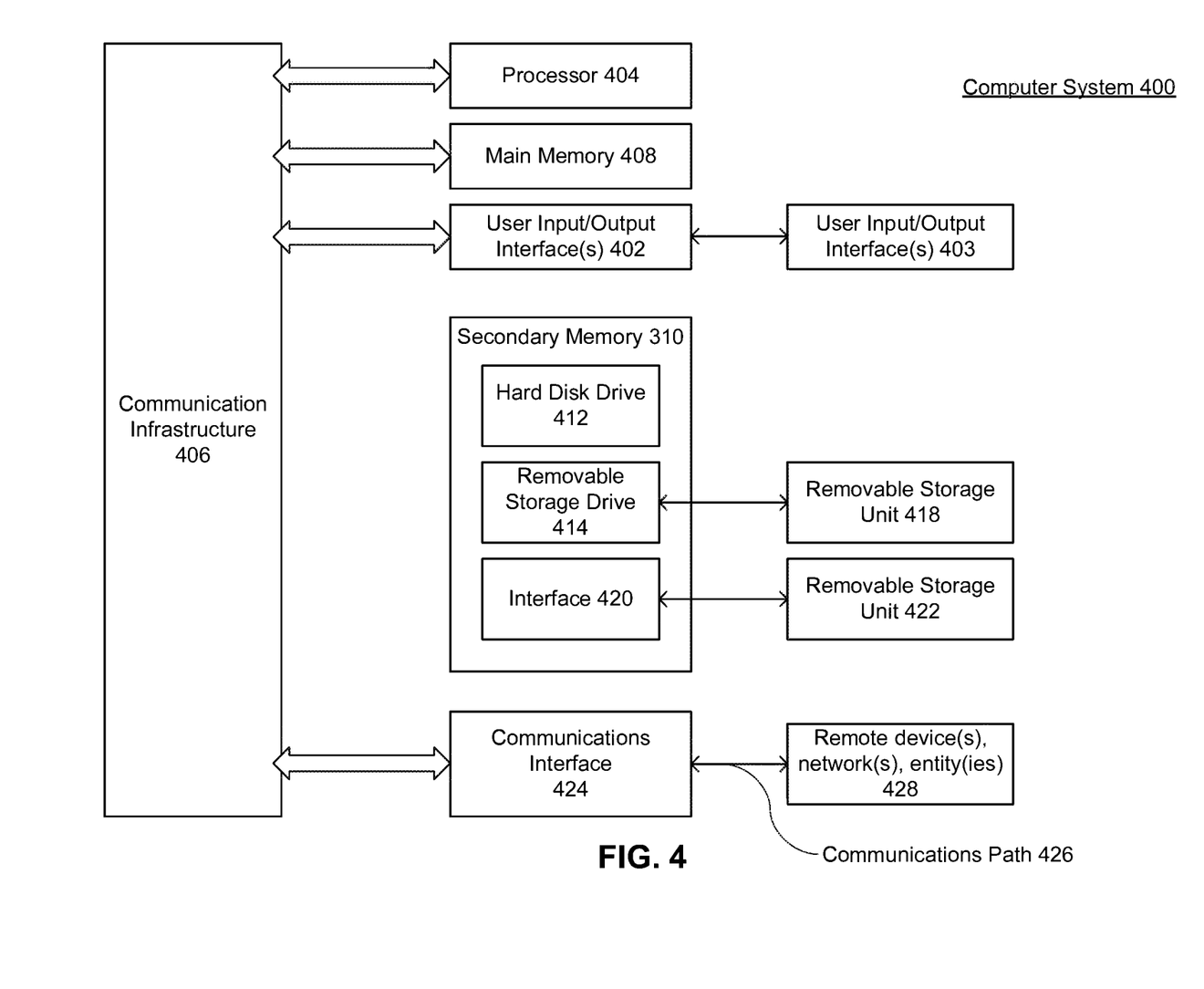
FIG. 4 illustrates a block diagram of a general-purpose computer that may be used to perform various aspects of the present disclosure, according to some embodiments.

Various embodiments may be implemented, for example, using one or more computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a bus or communication infrastructure 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example. With capabilities of general-purpose computing on graphics processing units (GPGPU), the GPU may be particularly useful in at least the image recognition and machine learning aspects described herein.

Additionally, one or more of processors 404 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or secondary memory 410. Secondary memory 410 may include, for example, a main storage drive 412 and/or a removable storage device or drive 414. Main storage drive 412 may be a hard disk drive or solid-state drive, for example. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communication path 426, which may be wired and/or wireless (or a combination thereof), and which may include any combination of LANs, WANs, the Internet, etc. Control logic and/or data may be transmitted to and from computer system 600 via communication path 426.

Computer system 400 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 400 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Scala, Clojure, Elixir, Swift, Go, Perl, PHP, Python, Ruby, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

Figure 5:
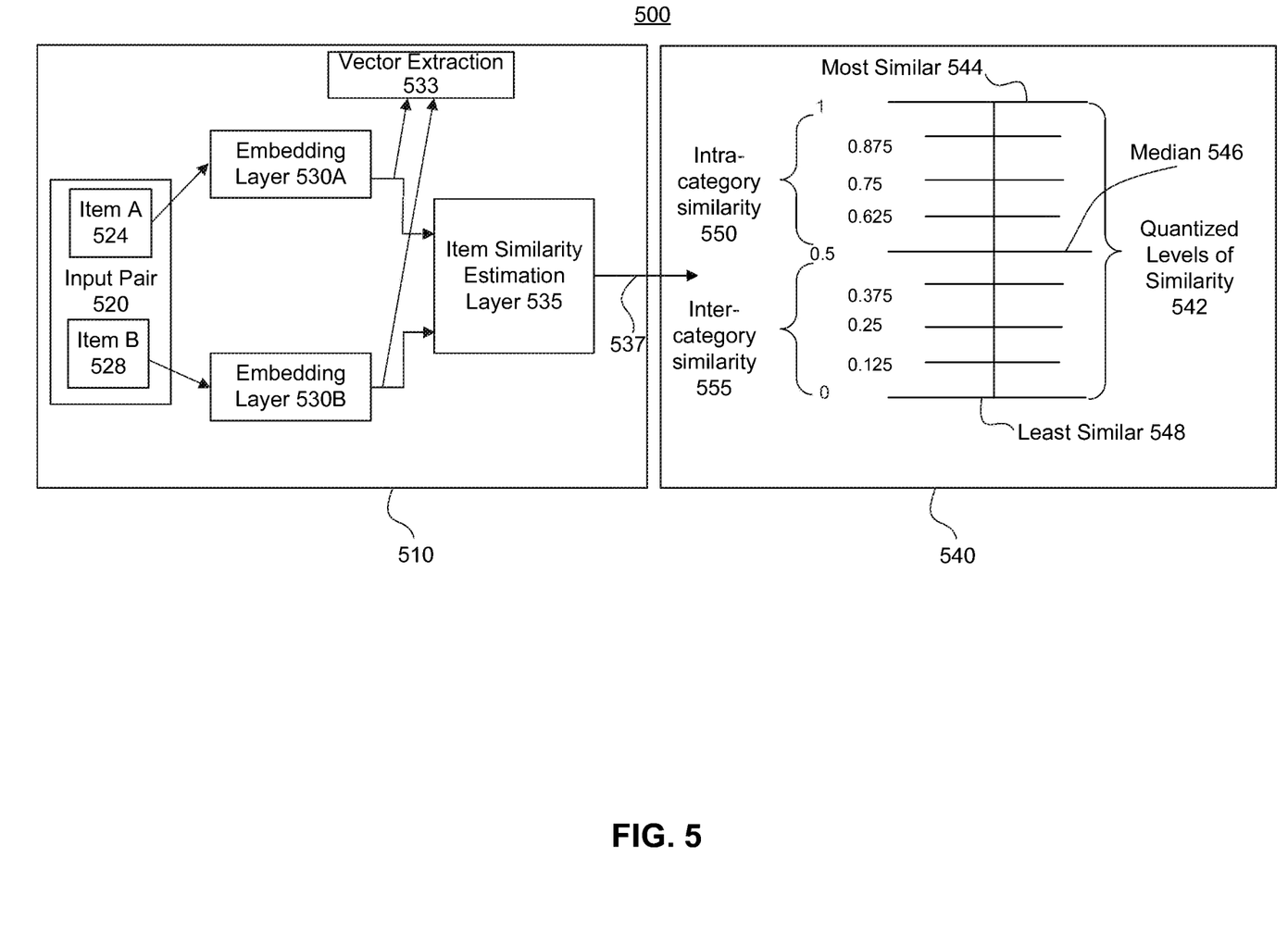
FIG. 5 illustrates a block diagram of a neural network and quantization table for saliency values, according to some embodiments.

FIG. 5 illustrates a block diagram 500 of a neural network 510 and quantization table 540 for similarity scores 537, according to some embodiments. The neural network 510 has an input of an input pair 520, embedding layers 530A and 530B for embedding items into vectors, and an item similarity estimation layer 535 for determining the similarity between the input pair 520.

The input pair 520 may be description information for any two items, item A 524 and item B 528. The block diagram 500 describes an embodiment for vectorising these two items, comparing them, and determining the similarity between them in a quantized fashion. Embodiments of this comparison may be used for determining clustering of vectors based on similarity.

Item A 524 is passed into embedding layer 530A and item B 528 is passed into embedding layer 530B. Embedding layer 530A outputs a vector representation for item A 524 and embedding layer 530B outputs a vector representation for item B 528. Embedding layers 530A and 530B may employ any vectorization method for vectorising a set of descriptors for an item.

In some embodiments, embedding layers 530A and 530B may be neural networks configured to train vectors based on descriptions of items. The descriptive information in item A 524 and item B 528 may be discretized such that it is broken into components for each descriptive element. Each such descriptive element may be formatted in a common format, such as a string or numeric symbol that is representative of original descriptive information of the items.

In some embodiments, after the embedding layers 530A and 530B train the vectors, the vectors may be extracted by vector extraction 533 for use in other calculations. For example, the vectors may be extracted to be compared as part of other input pairs.

The vectors are also passed on to item similarity estimation layer 535 for comparison. Item similarity estimation layer 535 compares the similarity between the vectors representing item A 524 and item B 528. This may be accomplished by a neural network or a non-linear function for comparing similarity. The output is a similarity score 537 which indicates a similarity between the vectors for the input pair 520.

In some embodiments, the similarity score 537 is a foundation on which an ontology can be built. For example, the embedding layers 530A and 530B may be used in step 310 to train feature vectors and the item similarity estimation layer 535 may be used in step 320 to determine clusters of items.

Similarity score 537 may be quantized according to the quantization table 540. This may be the result of how the item similarity estimation layer 535 is configured or a normalization may be applied to the similarity score 537 after it is generated.

The quantization may be broken up into quantized levels of similarity 542, such as the nine levels shown in FIG. 5. The quantization for most similar 544 is 1, the median similarity 546 is 0.5, and the least similar 548 is 0.

Scores between 0.5 and 1 indicate that there is intra-category similarity 550 between the two items in input pair 520. For example, the items may be in the same class of items, such as both being mobile phones. This level of similarity indicates that a number of their features have similar qualities.

Scores between 0 and 0.5 indicate inter-category similarity 555 between the two items in the input pair. For example, the items may be two completely different items, but may have some characteristics, like color, that are similar.

In some embodiments, a group of neural networks 510 may be used on groups of input pairs 520 of items that are to be sorted into clusters in an ontology based on the resulting similarity scores 537. Items may be sorted based on whether the comparison indicates inter-category similarity 555 or intra-category similarity 550 between the two items. Inter-category similarity 555 will result in two items being broken into separate clusters in a given level of the hierarchy, while intra-category similarity 550 will result in the two items being grouped together in a given level.

In some embodiments, a comparison of two vectors at one level of the ontology, such as level 210A (referring to FIG. 2), may result in a different similarity score 537 than in a different level of the ontology, such as 210B (referring to FIG. 2). This is because the quantization of the similarity scores 537 across a set of vectors will vary depending on the vectors in that set. The normalization into the quantized states of quantization table 530 is applied across the similarity scores in the given set of vectors. At different levels of the hierarchy, the sets of vectors that are compared may be more similar at a higher level, resulting in their being clustered together. When clustering at the next level, they may be compared amongst themselves. Because of this, the unquantized minimum level of similarity between two items will be higher since they all were previously quantized above 0.5. The normalization at this new level will result in some of the vectors falling below the 0.5 threshold and being separated into a different cluster.

In some embodiments, side information may be used to adjust the similarity score 536 in the quantization table 540. This side information may be applied to the vectors prior to item similarity estimation layer 535, may be included in the non-linear function or neural network of the item similarity estimation layer 535, or may be applied to the similarity score 537 to adjust the quantization level.

In some embodiments, the side information emphasizes important characteristics. For example, business data, such as sales data, may show that certain item characteristics are key characteristics. As a result, items with these characteristics may be considered more similar and are scaled appropriately. This scaling may be applied across multiple levels.

In some embodiment, side information may dictate structure of the hierarchy. For example, it may be a business objective to separate items by manufacturer, brand, or item type at one or more levels of the hierarchical ontology. Items with a particular manufacturer may all have their similarity score 537 scaled to or set to a value in the intra-category similarity. In this way, at a given hierarchy level, the items may be sorted by the particular side information into separate clusters by manufacturer.

In some embodiments, once the items are sorted by the characteristic, such as manufacturer, the specific side information may be modified discarded at further levels, since the characteristic may be identical for all items in a given cluster. In some embodiments, modifying the side information may mean de-emphasizing the particular characteristic, such as manufacturer, since it may be identical for all items in the cluster and thus may not provide any additional information when comparing items in the cluster.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different from those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents

What is claimed is:

1. A computer-implemented method comprising:
generating a hierarchical ontology for a plurality of for-sale objects (FSOs);
determining, based on a comparison of a first respective feature vector representing first features of a first respective FSO and a second respective feature vector representing second features of a second respective FSO, respective metrics between each pair of FSOs in the plurality of FSOs, wherein the first respective FSO and the second respective FSO make up the each pair of FSOs;
training the first and second respective feature vectors based on item information using a neural network to convert information that describes characteristics of the plurality of FSOs, wherein each element of the first and second respective feature vectors is a combination of numerical representations of one or more facets of the plurality of FSOs;
applying a weighting function to the first respective feature vector and the second respective feature vector before determining the respective metrics between the each pair of FSOs, wherein the weighting function incorporates side information about the plurality of FSOs, and wherein the weighting function is determined based on the side information about the plurality of FSOs represented by the first and second respective feature vectors or the facets of the plurality of FSOs and a quantization scale;
separating, based on the respective metrics and a clustering classification rule, each FSO from the plurality of FSOs into one or more clusters;
determining, for each cluster from the one or more clusters, a respective subset of the facets describing a respective set of FSOs from the plurality of FSOs, the respective set of FSOs being in the each cluster, wherein the respective subset of the facets each have a respective saliency greater than a threshold, and wherein the respective saliencies are based on a respective set of feature vectors describing the respective set of FSOs;

determining names of the each cluster based on a most important facet of the respective subset of the facets in the first and second respective feature vectors in the each cluster, wherein importance of the facets is determined based on an amount of contribute the facets make to divide the first and second respective feature vectors into the each cluster; and storing, based on the each cluster's respective hierarchical ontology of the respective subset of the facets, each named cluster.

2. The method of claim 1, wherein the respective metrics are a cosine similarity between two feature vectors.

3. The method of claim 1, wherein the respective saliences based on the respective set of feature vectors are determined from a Jacobian matrix formed based on the respective set of feature vectors.

4. The method of claim 1, wherein the threshold is chosen such that the respective subset of features comprises a number of features.

5. The method of claim 1, further comprising:
separating each FSO from the respective set of FSOs in the each cluster into a subset of clusters based on the respective metrics and the clustering classification rule;
determining, for each subset cluster from the subset of clusters, a respective subset of features describing a second respective set of FSOs from the respective set of FSOs, the second respective set of FSOs being in the each subset cluster, wherein the respective subset of features each have the respective saliency greater than a second threshold, and wherein the respective saliencies are based on a respective set of feature vectors describing the second respective set of FSOs; and
labeling the each subset cluster with the respective subset of features for the each subset cluster.

6. A system comprising:
a processor;
memory communicatively coupled to the processor, wherein the memory stores instructions configured to, when executed, cause the processor to:
generate a hierarchical ontology for a plurality of for-sale objects (FSOs);
determine, based on a comparison of a first respective feature vector representing first features of a first respective FSO and a second respective feature vector representing second features of a second respective FSO, respective metrics between each pair of FSOs in the plurality of FSOs, wherein the first respective FSO and the second respective FSO make up the each pair of FSOs;
train the first and second respective feature vectors based on item information using a neural network to convert information that describes characteristics of the plurality of FSOs, wherein each element of the first and second respective feature vectors is a combination of numerical representations of one or more facets of the plurality of FSOs;
apply a weighting function to the first respective feature vector and the second respective feature vector before determining the respective metrics between the each pair of FSOs, wherein the weighting function incorporates side information about the plurality of FSOs, and wherein the weighting function is determined based on the side information about the plurality of FSOs represented by the first and second respective feature vectors or the facets of the plurality of FSOs and a quantization scale;
separate, based on the respective metrics and a clustering classification rule, each FSO from the plurality of FSOs into one or more clusters;
determine, for each cluster from the one or more clusters, a respective subset of the facets describing a respective set of FSOs from the plurality of FSOs, the respective set of FSOs being in the each cluster, wherein the respective subset of the facets each have a respective saliency greater than a threshold, and wherein the respective saliencies are based on a respective set of feature vectors describing the respective set of FSOs;
determine names of the each cluster based on a most important facet of the respective subset of the facets in the first and second respective feature vectors in the each cluster, wherein importance of the facets is determined based on an amount of contribute the facets make to divide the first and second respective feature vectors into the each cluster; and
store, based on the each cluster's respective hierarchical ontology of the respective subset of the facets, each named cluster.

7. The system of claim 6, wherein the respective metrics are a cosine similarity between two feature vectors.

8. The system of claim 6, wherein the respective saliences based on the respective set of feature vectors are determined from a Jacobian matrix formed based on the respective set of feature vectors.

9. The system of claim 6, wherein the instructions further cause the processor to:
separate each FSO from the respective set of FSOs in the each cluster into a subset of clusters based on the respective metrics and the clustering classification rule;
determine, for each subset cluster from the subset of clusters, a respective subset of features describing a second respective set of FSOs from the respective set of FSOs, the second respective set of FSOs being in the each subset cluster, wherein the respective subset of features each have the respective saliency greater than a second threshold, and wherein the respective saliencies are based on a respective set of feature vectors describing the second respective set of FSOs; and
label the each subset cluster with the respective subset of features for the each subset cluster.

10. A non-transitory computer readable storage medium having computer readable code thereon, the non-transitory computer readable medium including instructions configured to cause a computer system to perform operations comprising:
generating a hierarchical ontology for a plurality of for-sale objects (FSOs);
determining, based on a comparison of a first respective feature vector representing first features of a first respective FSO and a second respective feature vector representing second features of a second respective FSO, respective metrics between each pair of FSOs in the plurality of FSOs, wherein the first respective FSO and the second respective FSO make up the each pair of FSOs;
training the first and second respective feature vectors based on item information using a neural network to convert information that describes characteristics of the plurality of FSOs, wherein each element of the first and second respective feature vectors is a combination of numerical representations of one or more facets of the plurality of FSOs;

applying a weighting function to the first respective feature vector and the second respective feature vector before determining the respective metrics between the each pair of FSOs, wherein the weighting function incorporates side information about the plurality of FSOs, and wherein the weighting function is determined based on the side information about the plurality of FSOs represented by the first and second respective feature vectors or the facets of the plurality of FSOs and a quantization scale;

separating, based on the respective metrics and a clustering classification rule, each FSO from the plurality of FSOs into one or more clusters;

determining, for each cluster from the one or more clusters, a respective subset of the facets describing a respective set of FSOs from the plurality of FSOs, the respective set of FSOs being in the each cluster, wherein the respective subset of the facets each have a respective saliency greater than a threshold, and wherein the respective saliencies are based on a respective set of feature vectors describing the respective set of FSOs;

determining names of the each cluster based on a most important facet of the respective subset of facets in the first and second respective feature vectors in the each cluster, wherein importance of the facets is determined based on an amount of contribute the facets make to divide the first and second respective feature vectors into the each cluster; and storing, based on the each cluster's respective hierarchical ontology of the respective subset of the facets, each named cluster.

11. The method of claim 1, further comprising:
receiving a posted FSO item;
indicating at least one of the FSOs from the plurality of FSOs clustered with the posted FSO item and characteristics of a cluster based on the respective saliency of the cluster;
receiving an item description for the posted FSO item; and
posting the posted FSO item with the item description.

12. The system of claim 6, wherein the instructions further cause the processor to:
receive a posted FSO item;
indicate at least one of the FSOs clustered with the posted FSO item and characteristics of a cluster based on the respective saliency of the cluster;
receive an item description for the posted FSO item; and
post the posted FSO item with the item description.

13. The system of claim 6, wherein the threshold is chosen such that a respective subset of features comprises a number of features.

14. The non-transitory computer readable storage medium of claim 10, the operations further comprising:
receiving a posted FSO item;
indicating at least one of the FSOs from the plurality of FSOs clustered with the posted FSO item and characteristics of a cluster based on the respective saliency of the cluster;
receiving an item description for the posted FSO item; and
posting the posted FSO item with the item description.

15. The non-transitory computer readable storage medium of claim 10, wherein the respective metrics are a cosine similarity between two feature vectors.

16. The non-transitory computer readable storage medium of claim 10, wherein the respective saliences based on the respective set of feature vectors are determined from a Jacobian matrix formed based on the respective set of feature vectors.

17. The non-transitory computer readable storage medium of claim 10, wherein the threshold is chosen such that a respective subset of features comprises a number of features.

18. The non-transitory computer readable storage medium of claim 10, the operations further comprising:
separating each FSO from the respective set of FSOs in the each cluster into a subset of clusters based on the respective metrics and the clustering classification rule;
determining, for each subset cluster from the subset of clusters, a respective subset of features describing a second respective set of FSOs from the respective set of FSOs, the second respective set of FSOs being in the each subset cluster, wherein the respective subset of features each have the respective saliency greater than a second threshold, and wherein the respective saliencies are based on a respective set of feature vectors describing the second respective set of FSOs; and
labeling the each subset cluster with the respective subset of features for the subset cluster.

* * * * *

UNITED STATES PATENT AND TRADEMARK OFFICE
CERTIFICATE OF CORRECTION

PATENT NO. : 12,124,495 B2
APPLICATION NO. : 17/168972
DATED : October 22, 2024
INVENTOR(S) : Moazzami et al.

Page 1 of 1

It is certified that error appears in the above-identified patent and that said Letters Patent is hereby corrected as shown below:

In the Claims

In Column 22, Claim 12, Line 1, after "FSOs" insert --from the plurality of FSOs--.

In Column 22, Claim 18, Line 45, before "subset" insert --each--.

Signed and Sealed this
Twenty-sixth Day of November, 2024

Katherine Kelly Vidal
*Director of the United States Patent and Trademark Office*